(No Model.)

H. E. MARCHAND.
MECHANICAL MOVEMENT.

No. 290,901. Patented Dec. 25, 1883.

Witnesses,
Robert Everett,
J. A. Rutherford.

Inventor:
Henry E. Marchand,
By James L. Norris,
Atty.

United States Patent Office.

HENRY E. MARCHAND, OF ALLEGHENY CITY, PENNSYLVANIA.

MECHANICAL MOVEMENT.

SPECIFICATION forming part of Letters Patent No. 290,901, dated December 25, 1883.

Application filed September 28, 1883. (No model.)

*To all whom it may concern:*

Be it known that I, HENRY E. MARCHAND, a citizen of the United States, residing at Allegheny City, in the county of Allegheny and State of Pennsylvania, have invented new and useful Improvements in Mechanical Movements, of which the following is a specification.

My invention relates to mechanical movements, and has for its object to provide simple and effective means for producing varying reciprocating motion from a crank to a wrist-pin.

To this end my invention consists in a sleeve mounted in suitable bearings, and having a cylindrical recess formed therein parallel with but eccentric to its axis, within which is placed a spindle or shaft having a crank or wrist-pin upon its outer end, a set-screw being placed in the sleeve and bearing upon the spindle, whereby the crank or wrist-pin may be set at varying distances from the center of rotation and the throw of the crank correspondingly varied.

Figure 1:
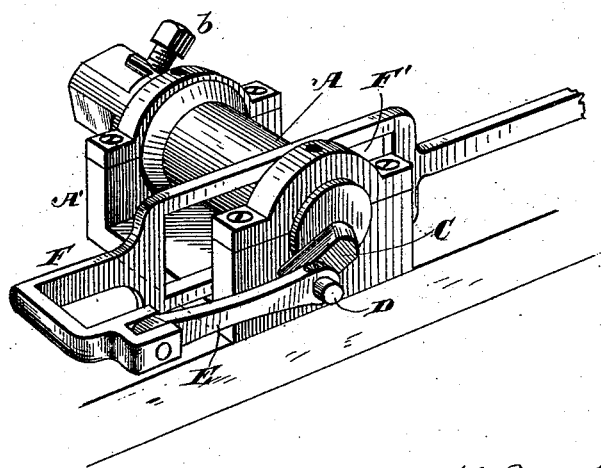
Figure 3:
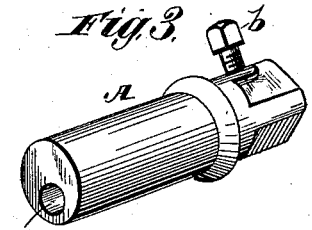
Figure 2:
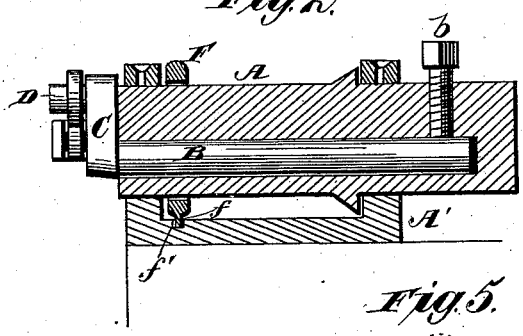
Figure 4:
Figure 5:
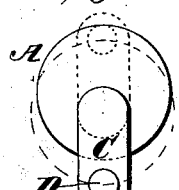

Referring to the drawings forming part of this specification, Figure 1 is a perspective view of an apparatus showing my invention. Fig. 2 is a longitudinal section of the spindle and sleeve-bearing detached. Fig. 3 is a detail perspective of the sleeve. Fig. 4 is a detail perspective of the spindle and wrist-pin. Fig. 5 is an end view of the sleeve, spindle, and crank-arm, showing in dotted lines the extremes of adjustment.

The letter A designates a shaft or sleeve, which is mounted in any suitable bearing, A', and may be rotated by a crank or pulley. Within this shaft is formed a cylindrical recess, $a$, which is parallel with the axis of the sleeve, but eccentric thereto. This opening receives a spindle, B, which fits closely therein, but which may be rotated when not locked rigid with the sleeve A by a set-screw, $b$, which passes through the sleeve and bears against the spindle B.

Upon the outer end of the spindle B is formed a crank-arm, C, which carries a wrist-pin, D, from which reciprocating motion is derived by means of a connecting-rod, E—as, for example, by a reciprocating bar, F, having a slot, F', which surrounds the sleeve A, and has support upon the base of the bearing A', said bar having a feather, $f$, which moves in a groove, $f'$, formed in the bearing-frame, to secure rectilinear motion.

It is evident that when the spindle B is rotated within the sleeve A until the wrist-pin D lies in a line drawn through the axis of the sleeve and spindle, and upon the same side of the axis as the spindle, as shown in full lines in Fig. 5, the greatest possible reciprocating motion will be obtained. In the same manner, if the spindle is turned until the wrist-pin lies in said line, but upon the side of the axis opposite the spindle, the minimum reciprocation will be given, as shown in dotted lines, Fig. 5. Between these two points any desired variation is readily obtained by the adjustment of said pin relatively to the center of rotation of the sleeve A, the spindle B being locked in any desired position by the set-screw $b$.

By this invention I provide simple and convenient means of obtaining varying reciprocating motion, which may be used in a great variety of apparatus, being applicable to jig-saws, printing-presses in which the stroke is adjustable, to drive the needle-bar in sewing-machines, for valve-movements, cut-off for engines, for agricultural apparatus, and many other purposes.

In Fig. 1 I have shown a convenient form of apparatus for applying my invention to use. The sleeve A is mounted in journal-bearings of the usual form, and the spindle B is placed in its recess and locked by the set-screw $b$. The wrist-pin D carries a connecting-rod, E, which slides upon the base A' of the bearing, being guided by the means named above. The bar F may be slotted to permit the sleeve to pass through it in the manner shown, and its end may be connected in any suitable manner to the device to which motion is to be imparted.

Having thus described my invention, what I claim is—

1. The combination of a sleeve mounted to rotate in a bearing, and having an eccentric longitudinal recess, a spindle arranged to be rotated in said recess, and provided with a crank and wrist-pin at its outer end, and a set-screw extending transversely into the sleeve to bear on the spindle, substantially as and for the purposes described.

2. The combination, with the sleeve or shaft A, having a cylindrical recess, $a$, of a spindle, B, having a crank and wrist-pin upon its end, a reciprocating bar, F, having slot F′, and moving in a slotted support, a connecting-rod, E, and the set-screw $b$, substantially as described.

In testimony whereof I have hereunto set my hand in the presence of two subscribing witnesses.

H. E. MARCHAND.

Witnesses:
C. S. FETTERMAN,
ROBT. S. FRAZER.